United States Patent
Hübel et al.

(10) Patent No.: US 11,514,050 B2
(45) Date of Patent: Nov. 29, 2022

(54) METHOD AND SYSTEM FOR ASCERTAINING A HUE

(71) Applicant: Hubergroup Deutschland GmbH, Kirchheim-Heimstetten Bayern (DE)

(72) Inventors: Patrick Hübel, Poing (DE); Carlo Carnelli, Saronno VA (IT)

(73) Assignee: HUBERGROUP DEUTSCHLAND GMBH, Kirchheim-Heimstetten Bayern (DE)

(*) Notice: Subject to any disclaimer, the term of this patent is extended or adjusted under 35 U.S.C. 154(b) by 0 days.

(21) Appl. No.: 17/262,659

(22) PCT Filed: Jul. 11, 2019

(86) PCT No.: PCT/EP2019/068760
§ 371 (c)(1),
(2) Date: Jan. 22, 2021

(87) PCT Pub. No.: WO2020/020660
PCT Pub. Date: Jan. 30, 2020

(65) Prior Publication Data
US 2021/0303563 A1  Sep. 30, 2021

(30) Foreign Application Priority Data
Jul. 27, 2018  (EP) .................................... 18186158

(51) Int. Cl.
*G06F 16/2455* (2019.01)
(52) U.S. Cl.
CPC ................ *G06F 16/2455* (2019.01)
(58) Field of Classification Search
None
See application file for complete search history.

(56) References Cited

U.S. PATENT DOCUMENTS 5,255,350 A * 10/1993 Hermann ................ B01F 33/84
358/1.9
7,016,075 B1 * 3/2006 Tsukada ................ H04N 1/628
358/1.9
2004/0246529 A1 * 12/2004 Pruden ............ G06K 19/06037
235/494
2006/0012810 A1   1/2006 Postle et al.
2006/0062441 A1   3/2006 Nishida
2009/0180164 A1   7/2009 Miyagi
2010/0067056 A1   3/2010 Rich et al.

FOREIGN PATENT DOCUMENTS

| EP | 0527108 A2 | 2/1993 |
| EP | 1248087 A1 | 10/2002 |
| JP | H08256836 A | 8/1996 |
| RU | 2637914 C1 | 12/2017 |

OTHER PUBLICATIONS

International Search Report for corresponding PCT Application No. PCT/EP2019/068760 dated Oct. 18, 2019.

* cited by examiner

*Primary Examiner* — Christopher J Raab
(74) *Attorney, Agent, or Firm* — Wood, Phillips, Katz, Clark & Mortimer

(57) ABSTRACT

The invention relates to a system and a method for ascertaining a color recipe, having the steps of: a) providing a database with a plurality of data sets, b) specifying a target application method, a target substrate, and a desired target hue by means of a user, c) searching the database using a computer program, and d) displaying stored information relating to the color recipe of at least one data set if found. The database for at least one hue comprises at least two different respective data sets, each of which comprises the same hue identification code but different substrates and/or application methods, and different color recipes, and the database for at least one color recipe comprises at least two different respective data sets, each of which comprises the same color recipe identification code but different substrates and/or application methods, and the resulting hue, wherein i) at least 90% of the data sets with different hues contain a respective different hue identification code than the other data sets, and/or ii) at least 90% of the data sets with different color recipes contain a respective different color recipe identification code than the other data sets.

11 Claims, No Drawings

METHOD AND SYSTEM FOR ASCERTAINING A HUE

FIELD OF THE INVENTION

The present invention relates to a system as well as a method for ascertaining a color recipe, which after application using a specified application method, such as a flat printing method, on a specified substrate, such as paper, results in a color product, such as printed paper, with a specified hue.

BACKGROUND OF THE INVENTION

Such systems and methods are used for a wide variety of applications, including in packaging development. For example, when developing packaging, such as food packaging, a new, colorful, multi-color design is created, the exact production of which requires that the colors specified by the packaging developer can be exactly realized when printing the packaging with the color recipes used to reproduce the different colors. However, the hue achieved after the application of a color recipe using an application method, i.e. in the case of printing, the hue achieved after printing a printing ink onto a substrate, depends on a number of factors, in particular on the specific type of substrate and on the application method used. Printing a printing ink with flexographic printing on paperboard can result in a printed product with a significantly different hue than, for example, printing the same printing ink on coated paper using a gravure printing method. In addition, a known gravure printing ink for paper, which produces the hue required by the packaging developer, when applied to the desired packaging board using a gravure printing method, will not lead to the desired hue. It is therefore necessary to find a printing ink that gives the desired hue for the specific substrate and the desired printing method, or, if not already available, it has to be developed.

In addition to the desired hue resulting after application to the target substrate using the specified application method, the color recipe that is suitable for a new application, such as for a new packaging, must meet a variety of other criteria. Depending on the application, the color recipe must, for example, have a specified gloss value and be characterized by a more or less pronounced chemical resistance or a more or less pronounced resistance to light, to name just a few of the required requirements.

In order to make it easier for packaging developers and other users to find a suitable color recipe for a specific system despite these complex relationships, databases and computer programs have already been developed that allow a user to specify desired target parameters such as the target hue, the substrate, the application method with which the color recipe is to be applied on the substrate, the required chemical resistance of the color product obtained after the application of the color recipe to the substrate, and other parameters. The computer program then searches the database for a suitable color recipe and displays the color recipe which, according to the information stored in the database, after application to the target substrate using the specified application method, results in a color product with a hue that comes closest to the required target hue. For this purpose, the database contains a large number of data sets, with each data set including information about a color recipe, about a substrate, about an application method and about the hue of the color product resulting after the application of the color recipe stored in the data set using the application method stored in the data set on the substrate stored in the data set and possibly information on further parameters, such as the chemical resistance. If no color recipe is found which at least approximately results in the desired target hue, the user is shown that no hit was found.

Such a method and system is sold, for example, under the trade name PantoneLIVE.

From U.S. Pat. No. 7,034,960 B2 a method of using a database to develop a color product is known, the method comprising the steps of: i) storing development information in the database, wherein the development information comprises properties related to the development of a plurality of color products, ii) receiving first color information comprising at least a first color, iii) identifying first development information in the database, wherein the first development information includes at least the first color, iv) receiving at least one physical property of the color product and v) using the first development information to determine whether the at least one physical property is compatible with the first color. If the at least one physical property is not compatible with the first color, the method is either terminated or a warning is displayed to the user that at least one physical property is not compatible with the first color. The user can then change his desired design or the requirements placed on the color product until a corresponding hit for a color recipe is found in the database. The latter, however, is not a satisfactory solution, since in this case the user does not receive a color recipe which results in the color product that is desired at the outset.

A disadvantage of the known methods is that they use databases which are comparatively redundant, i.e. which contain a large number of different data sets for the same or very similar information. The known databases contain around 90% of such redundant information. If, for example, a user enters a new data set that concerns a color recipe that is almost identical, is completely identical or at least very similar to a color recipe already stored in another data set, this new data set is still stored, even if this data set contains information about the same substrate and the same application method and thus also about the same or almost identical hue resulting for the color product as the already stored data set. It should be noted that the human eye cannot perceive the slightest differences between two almost identical hues, so that two almost identical hues that result when only minimally differing color recipes are applied to the same substrate using the same application method are usually indistinguishable to the human eye. The database then contains two or more data sets which contain information about an almost identical or very similar color recipe, identical information about the substrate and the application method, and almost identical or very similar information about the hues which result after application of the color recipes using the application method to the substrate and are indistinguishable to the human eye. However, this presence of a large number of data sets which contain almost identical or very similar information is disadvantageous for the user of the method who wants to use a large number of the color recipes stored in the database for one or more projects. This is because the user or the company commissioned by the user with the production of the color recipes, such as the operator of the database, must, for each of the almost identical or very similar color recipes to be used, provide a separate production specification, a separate quality control specification, and storage space for the components of the color recipes and for the color recipes produced. Another disadvantage of the redundant data sets is that they, with regard to the color recipe, the substrate, the application method and the hue resulting after the application of the color recipe using the application method on the substrate, are identical or almost identical with regard to other parameters, such as chemical resistance or temperature resistance, for example, due to the use of different measurement methods to ascertain these parameters in the information contained in the different data sets, due to rounding errors in numerical values obtained in measurements, or due to input error(s) by a user. Two almost identical or even completely identical data sets relating to color recipes then contradict each other with regard to the information stored in the data sets about the properties of the color recipes or at least differ from one another. For all these reasons, the known methods, based on the number of data sets contained therein, cover comparatively few variants of the multitude of variants from the matrix consisting of hue, substrate, color recipe and application method. Another disadvantage of the known methods is that the data sets which relate to identical or almost identical color recipes or which relate to identical or almost identical hues resulting for the color product are not linked to one another in such a way that a person skilled in the art can display a plurality of such data sets which, when applied to different substrates, result in the same hue.

Proceeding from this, the present invention was based on the object of providing a system and a method for ascertaining a color recipe, which, after application using a specified application method on a specified substrate, results in a color product with a specified hue, and which makes it possible, with the smallest possible number of data sets contained in the database, to cover the largest possible number of variants of the matrix consisting of hue, substrate, color recipe and application method. In other words, it is the aim of the present invention to provide a corresponding system and method with which a user has the highest possible likelihood that this will display a suitable color recipe for a target application method specified by him, a target substrate specified by him and a target hue specified by him, with which color recipe he obtains a color product with the specified target hue after the application of the color recipe using the specified target application method on the specified target substrate, wherein the system and the method uses a database which contains the smallest possible number of different color recipes.

BRIEF SUMMARY OF THE INVENTION

According to the invention, this object is achieved by a method for ascertaining a color recipe which, after application using a specified application method on a specified substrate, results in a color product with a specified hue, the method comprising:
a) providing a database in which a plurality of data sets are stored, wherein
  i) at least a part and preferably each of the data sets comprises at least information about a color recipe, about a substrate, about an application method and about the hue of the color product resulting after the application of the color recipe stored in the data set using the application method stored in the data set on the substrate stored in the data set, wherein the information about the color recipe includes a color recipe identification code and the information about the hue includes a hue identification code,
  ii) the database, for at least one hue, comprises at least two different data sets, each of which includes the same hue identification code and information about different color recipes, about a substrate and about an application method, wherein the substrate and/or the application method of at least one of the at least two different data sets differs from the substrate and/or application method of another of the at least two different data sets, wherein for each of the different color recipes of the at least two different data sets in each case a color product with the same hue is obtained after the application of the relevant color recipe using the application method stored in the relevant data set to the substrate stored in the relevant data set, and
  iii) the database, for at least one color recipe, comprises at least two different data sets, which each have the same color recipe identification code and information about the same color recipe, about a substrate, about an application method and about a hue resulting for the color product after the application of the color recipe stored in the relevant data set using the application method stored in the relevant data set to the substrate stored in the relevant data set, wherein the substrate and/or the application method of at least one of the at least two different data sets differs from the substrate and/or application method of another of the at least two different data sets, and wherein after the application of the relevant color recipe using the application method stored in the relevant data set, a color product results, wherein the hue of the color product of at least one of the at least two different data sets differs from the hue of the color product of another of the at least two different data sets,
b) specification by a user of a target application method, of a target substrate and of a desired target hue that results for the obtained color product after the application of a color recipe using the specified target application method on the specified target substrate,
c) searching the database with a computer program to see whether it contains at least one data set whose color recipe, about which information is contained in the data set, after application using the target application method specified in step b) onto the target substrate specified in step b), results in a color product with a hue which corresponds to the target hue specified in step b) or deviates from it at most by a specified tolerance, and
d) if at least one suitable data set is found in step c), displaying the information about the color recipe stored in the at least one data set,
wherein:
i) in at least 90% of the data sets in which information is stored about a hue which differs from the hue of one or more other data sets, a different hue identification code is stored than in the one or more other data sets,
and/or
ii) in at least 90% of the data sets in which information is stored about a color recipe which differs from the color recipe of one or more other data sets, a different color recipe identification code is stored than in the one or more other data sets.

DETAILED DESCRIPTION OF THE INVENTION

In the context of the present patent application, two or more identical hues are understood to mean that the two or more hues are viewed under the same light, preferably under the same standard light according to ISO 3664, or, for example, measured under the measurement conditions M0, M1, M2 or M3, are indistinguishable to the human eye. In particular, two or more identical hues are understood to mean that the two or more hues differ from one another by a Delta E value (which reflects the overall color distance) of not more than 0.5, preferably by a $\Delta E_{00}$ value of not more than 0.5 and preferably by a dH* (which reflects the color angle distance) of a maximum of 0.5, particularly preferably a dH* of a maximum of 0.2. The parameters $\Delta E$ and dH* are defined in DIN EN ISO 11664-6: 2014.

Analogously, two or more identical color recipes in the context of the present patent application are understood to mean color recipes which have the same coloring components and deviate from one another in terms of the amounts of the individual coloring components by a maximum of 0.5% per coloring component. Thus, according to the present patent application, two or more color recipes are considered to be different if they have at least one different coloring component or, if they have the same coloring components, differ from one another by more than 0.5% per component in terms of the amounts of the individual coloring components. In this context, a component is understood to be an individual component (that is to say a raw material) of the color recipe or a semi-finished product contained in the color recipe or a finished product contained in the color recipe. Furthermore, a coloring component is understood to mean a component whose addition changes the hue of the color recipe. On the other hand, components whose addition does not change the hue of the color recipe are referred to as color-neutral.

Since the database used according to the invention comprises different data sets each relating to the same color recipe, for which, after the application of the same color recipe stored in the data sets using the application methods stored in the respective data sets to the substrate stored in the respective data sets, color products are obtained each with a different hue, and each of these data sets contains the same color recipe identification code, for example a code made up of numbers and/or letters, it can be reliably prevented that the database contains unnecessarily redundant data sets, i.e. a large number of different data sets for the same or very similar information. When a user creates a new data set, the database must assign a color recipe identification code. In this context, the user or, preferably, the computer program operating the data entry into the database, automatically checks whether or not, for the color recipe about which information is to be stored in the data set to be newly created, at least one data set is already included within the aforementioned tolerance range (i.e. having the same coloring components and deviating with regard to the amounts of the individual coloring components by a maximum of 0.5% per component). If not, the new data set is created and a newly assigned color recipe identification code is stored in it. If so, it is also checked whether the at least one data set contains information about the same substrate, about the same application method and about the same hue resulting after the application of the color recipe using the application method on the substrate. If so, the user receives a message that the database already contains a corresponding data set and, depending on the embodiment, the data set to be created is not created or is created only if the user confirms that it should be created anyway. If not, so if at least one data set for the color recipe was found in the database, but this does not contain information about the same substrate, about the same application method and about the same hue, the same color recipe identification code, that is, the same information about the color recipe, is stored in the new data set to be created, that is, the same information about the color recipe is stored as in the at least one already stored data set, as well as the same parameters directly associated with the color recipe. For example, the UV resistance, temperature resistance or chemical resistance of the color recipe depends only on the color recipe itself. Therefore, the same information is stored for the parameters directly associated with the color recipe in all data sets that have the same color recipe identification code. This can be done, for example, simply by the fact that these data sets for these parameters access a table relating to this color recipe, in which all information about the parameters directly associated with the color recipe is stored. This not only ensures that the database does not contain two or more data sets which contain information about almost identical or very similar color recipes, identical information about the substrate and the application method, and almost identical or very similar information about the hues which result after application of the color recipes using the application method on the substrate and are indistinguishable to the human eye. In addition, this reliably prevents the data sets relating to the same color recipe from containing different information with regard to the parameters directly associated with the color recipe, such as chemical resistance or temperature resistance of the color recipe. This not only ensures high data quality, but also ensures that the user of the method who wants to use a large number of the color recipes stored in the database for one or more projects can manage with a comparatively small number of different color recipes. This is advantageous because the user or the company commissioned by the user to produce the color recipes would have to provide a separate production specification, a separate quality control specification and storage space for the components of the color recipes and for the color recipes produced for each of the almost identical or very similar color recipes, which are replaced by one color recipe according to the invention. For all these reasons, based on the number of data sets contained therein, the method according to the invention covers a very large number of variants from the matrix consisting of hue, substrate, color recipe and application method.

Another advantage of the method according to the invention is that by assigning the same hue identification codes for data sets which lead to color products with the same hues lying within the tolerance range, as well as by assigning the same color recipe identification codes for data sets which relate to the same color recipes within the tolerance range, both the data sets which relate to identical or almost identical color recipes are linked and the data sets which result in color products with identical or almost identical hues are linked. This has the advantage that a user who wants to achieve the same hue, such as a special blue tone, for one of his products for all of the packaging sold by him, regardless of the substrate used, can display all data sets which result in this hue. In this way, he can ascertain a color recipe with which he can achieve this special shade of blue on metal, ascertain a color recipe with which he can achieve this special shade of blue on a food packaging cardboard and/or ascertain a color recipe with which he can achieve this special shade of blue on a polypropylene film. This would not be possible without the assignment of the same hue identification code for data sets which lead to the same hues within the tolerance range, since the user could then only search in the computer program for data sets relating to a hue corresponding to very special lab values, but not for all data sets that result in a hue that is indistinguishable from the target hue to the human eye. In the same way, the user can use the method according to the invention, by assigning the same color recipe identification codes for data sets which relate to the same color recipes within the tolerance range, to display all of the data sets relating to the same color recipe lying within a tolerance range and can thus determine with little effort for how many of his various projects he can use a certain color recipe. This gives the user a better basis for decision-making as to whether it is worthwhile for him to produce larger quantities of this color recipe in a production batch, without the storage time until the production batch is finally used up becoming uneconomically long.

In that in at least 90% of the data sets in which information is stored about a hue which is different from the hue of one or more other data sets, a different hue identification code is stored than in the one or more other data sets, and/or in at least 90% of the data sets in which information is stored about a color recipe which is different from the color recipe of one or more other data sets, a different color recipe identification code is stored than in the one or more other data sets, unnecessary redundancy of the database is avoided. Preferably, in at least 90% of the data sets in which information is stored about a hue which differs from the hue of one or more other data sets, a different hue identification code is stored than in the one or more other data sets, and are in at least 90% of the data sets in which information is stored about a color recipe which is different from the color recipe of one or more other data sets, a different color recipe identification code is stored than in the one or more other data sets.

According to the invention, at least some of the data sets each include at least information about a color recipe, about a substrate, about an application method and about the hue of the color product resulting after the application of the color recipe stored in the data set using the application method stored in the data set on the substrate stored in the data set. Preferably at least 50%, more preferably at least 70%, particularly preferably at least 80%, more preferably at least 90%, very particularly preferably at least 95% and most preferably all of the data sets each include at least information about a color recipe, about a substrate, about an application method and about the hue of the color product resulting after the application of the color recipe stored in the data set using the application method stored in the data set on the substrate stored in the data set, wherein the information about the color recipe includes a color recipe identification code and the information about the hue includes a hue identification code.

According to the invention, the database comprises at least two different data sets for at least one hue, whereby two or more identical hues are understood to mean that the two or more hues, viewed under the same light, preferably under the same standard light according to ISO 3664 or, for example, measured under the measurement conditions M0, M1, M2 or M3, are indistinguishable to the human eye and in particular deviate from one another by a Delta E value of not more than 0.5. All common Delta E values can be used as Delta E values, such as the $\Delta E^*_{ab}$, the $\Delta E94$, the $\Delta E_{00}$, the DIN99, the DIN99$_o$, the CMC, the Lübbe, the Lübbe corrected, the CIECAM02. Preferably the $\Delta E_{00}$ is used. In principle, two different hues with a deviation of the $\Delta E_{00}$ value of up to 1 corresponds to a very small hue deviation that can only be seen by a trained eye. Deviations in the $\Delta E_{00}$ value of up to 0.5 are considered normally not visible and deviations in the $\Delta E_{00}$ values of up to 0.2 can no longer be seen even by a trained eye.

The database preferably comprises at least two different data sets for at least one hue, whereby two or more identical hues are understood to mean that the two or more hues, viewed under the same light, preferably under the same standard light according to ISO 3664 or, for example, measured under the measurement conditions M0 M1, M2 or M3, differ from one another by a $\Delta E_{00}$ value of not more than 0.5 and particularly preferably differ from one another by a $\Delta E_{00}$ value of not more than 0.2. In contrast, two hues are assessed as different from one another if they differ from one another by a Delta E value of more than 0.5 and preferably deviate by a $\Delta E_{00}$ value of more than 0.5. The two or more hues, viewed under the same light, preferably differ by a dH* of a maximum of 0.5 and particularly preferably by a dH* of a maximum of 0.2.

In order to use the advantages of the present invention particularly well, it is proposed in a further development of the concept according to the invention that the database for at least 10%, preferably for at least 20%, particularly preferably for at least 50%, more preferably for at least 70%, very particularly preferably for at least 90% and most preferably for all hues comprises at least two different data sets, each of which comprises the same hue identification code and information about different color recipes, about a substrate, and about an application method, wherein the substrate and/or application method of each of the at least two different data sets differs from the substrate and/or application method of each of the other at least two different data sets, wherein for each of the different color recipes of the at least two different data sets a color product with the same hue is obtained after the application of the relevant color recipe using the application method stored in the relevant data set on the substrate stored in the relevant data set.

In the embodiment described above, it is particularly preferred that the database, for the at least one hue, comprises at least two different, preferably at least six different, particularly preferably at least ten different and very particularly preferably at least twenty different data sets each containing the same hue identification code and information about color recipes different from one another, about a substrate and about an application method, wherein the substrate and/or application method of each of the at least four different data sets differs from the substrate and/or application method of each of the other at least four different data sets, wherein for each of the different color recipes of the at least four different data sets a color product with the same hue is obtained after the application of the relevant color recipe using the application method stored in the relevant data set on the substrate stored in the relevant data set.

It is preferably provided that in at least 95%, preferably in at least 97%, particularly preferably in at least 99% and most preferably in all of the data sets in which information is stored about a hue which is different from the hue of one or more other data sets, a different hue identification code is stored than in the one or more other data sets. It is therefore highly preferred that in each data set for which, after the application of the color recipe stored in the relevant data set using the application method stored in the relevant data set on the substrate stored in the relevant data set, a color product is obtained with a hue different from the hue obtained for another data set, a different hue identification code is stored than in all of the other at least one other data set. In this context, two or more different hues are in turn understood to mean hues which—viewed under the same light, preferably viewed under the same standard light, such as measured under standard light according to ISO 3664 or, for example, under the measurement conditions M0, M1, M2 or M3—deviate from each other by a Delta E value of more than 0.5 and preferably by a $\Delta E_{00}$ value of more than 0.5.

It is also preferred that in at least 90%, preferably in at least 95%, more preferably in at least 97%, particularly preferably in at least 99% and most preferably in all of the data sets in which information is stored about a hue which, lying within the tolerance range, is the same as the hue of one or more other data sets, the same hue identification code is stored as in the one or more other data sets.

The hue identification code stored in each of the data sets can in particular be a numerical and/or letter code or a text.

The information about the hue stored in the data sets can be any type of information which allows the hue to be characterized and distinguished from other hues. According to a particularly preferred embodiment of the present invention, the information about the hue is the data of a spectral curve that has been obtained by applying the color recipe stored in the relevant data set using the application method stored in the relevant data set on the substrate stored in the relevant data set and then recording a spectral curve from the surface of the resulting color product with a spectrophotometer over a wavelength range from 180 to 4,000 nm. The recorded spectral curve is particularly preferably a spectral reflection curve recorded over a wavelength range from 400 to 700 nm. The spectral reflection curve can be recorded in such a way that the overall reflection, the total reflection, the diffuse reflection or the directed reflection is measured. The light spectrum is preferably radiated onto the color product to be measured at a first angle and the reflection is measured with a sensor at a second angle. For example, the light source can radiate the light spectrum at an angle of 45° onto the color product and the sensor can measure the reflection at 0°, wherein both angles are meant in relation to the vertical, i.e. the plane perpendicular to the color product surface, so 0° corresponds to the vertical. Alternatively, the light source can radiate the light spectrum at an angle of 0° onto the color product and the sensor can measure the reflection at 45°, or the light source can radiate the light spectrum diffusely onto the color product and the sensor can measure the reflection at 0°, 8° or any other angle. The data of the spectral curve in this embodiment of the present invention can be the reflection values for every nanometer in the measured wavelength range, the reflection values for every fifth nanometer in the measured wavelength range, the reflection values for every tenth nanometer in the measured wavelength range or the reflection values at other intervals.

According to an alternative embodiment of the present invention, the information about the hue can also be the values in a color space which correspond to the hue. According to this embodiment, the information about the hue is preferably the lab values of the hue. Alternatively, the values from other color spaces can also be used, such as LUV values, RGB values, LCh values, XYZ values or the like.

The above statements regarding the information about the hue stored in the data sets of the database apply equally to the target hue to be entered in step b) of the method according to the invention. The target hue to be specified by the user in step b) can therefore be the data of a spectral curve recorded over a wavelength range from 180 to 4,000 nm and preferably over a wavelength range from 400 to 700 nm, such as in particular a spectral reflection curve, or can be the lab values of the hue or the like.

According to the invention, two color recipes are assessed as the same in the database if they have the same coloring components and differ from one another by a maximum of 0.5% per coloring component with regard to the amounts of the individual coloring components. On the other hand, two or more color recipes are assessed as different from one another if they have at least one different coloring component or, if they have the same coloring components, differ from one another by more than 0.5% per component with regard to the amounts of the individual coloring components.

In order to achieve—based on the number of data sets contained therein—a particularly large number of variants from the matrix consisting of hue, substrate, color recipe and application method, it is proposed in a further development of the concept according to the invention that the database for at least 10%, more preferably for at least 20%, particularly preferably for at least 50%, more preferably for at least 70%, very particularly preferably for at least 90% and most preferably for all color recipes each comprises at least two different data sets, which each comprise the same color recipe identification code and information about the same color recipe, about a substrate, about an application method and about a hue resulting for the color product after the application of the color recipe stored in the relevant data set using the application method stored in the relevant data set on the substrate stored in the relevant data set, wherein the substrate and/or the application method of each of the at least two different data sets differs from the substrate and/or application method of each of the other at least two different data sets, and wherein after the application of the relevant color recipe using the application method stored in the relevant data set to the substrate stored in the relevant data set a color product results, wherein the hue of the color product of each of the at least two different data sets differs from the hue of the color products of all of the other at least two different data sets.

In this embodiment, it is particularly preferred that the database, for the at least one color recipe, comprises at least two different, preferably at least six different, particularly preferably at least ten different and very particularly preferably at least twenty different data sets, each of which has the same color recipe identification code and information about the same color recipe, about a substrate, about an application method and about a hue resulting for the color product after the application of the color recipe stored in the relevant data set using the application method stored in the relevant data set on the substrate stored in the relevant data set, wherein the substrate and/or the application method of each of the at least four different data sets differs from the substrate and/or application method of each of the other at least four different data sets, and wherein after the application of the relevant color recipe using the application method stored in the relevant data set on the substrate stored in the relevant data set, a color product results, wherein the hue of the color product of each of the at least four different data sets differs from the hue of the color products of all of the other at least four different data sets.

In order to achieve a high data quality, according to a particularly preferred embodiment of the present invention, it is particularly preferred that in at least 90%, preferably in at least 97%, particularly preferably in at least 99% and most preferably in all of the data sets in which information is stored about a color recipe which is different from the color recipe of one or more other data sets, a different color recipe identification code is stored than in the one or more other data sets.

It is also preferred that in at least 90%, preferably in at least 95%, more preferably in at least 97%, particularly preferably in at least 99% and most preferably in all of the data sets in which information is stored about a color recipe which, lying within the tolerance range, is the same as the color recipe of one or more other data sets, the same color recipe identification code is stored as in the one or more other data sets.

According to a particularly preferred embodiment of the present invention, it is provided that in at least 99% and most preferably in all of the data sets in which information is stored about a hue which is different from the hue of one or more other data sets, a different hue identification code is stored than in the one or more other data sets, and also in at least 99% and most preferably in all of the data sets in which information is stored about a color recipe which is different from the color recipe of one or more other data sets, a different color recipe identification code is stored than in the one or more other data sets, furthermore in 99% and most preferably in all of the data sets in which information is stored about a hue which, lying within the tolerance range, is the same as the hue of one or more other data sets, the same hue identification code is stored as in the one or more other data sets, and finally in 99% and most preferably in all of the data sets in which information is stored about a color recipe which, lying within the tolerance range, is the same as the color recipe of one or more other data sets, the same color recipe identification code is stored as in the one or more other data sets.

The color recipe identification code stored in each of the data sets can be, in particular, a numerical and/or letter code or a text.

In order to achieve a high data quality in the database with a view to ensuring that the same information is stored for the parameters directly associated with the color recipe in each data set of the database relating to the same color recipe or at least nearly the same color recipe, it is proposed in a development of the concept according to the invention that at least 10%, preferably at least 25%, more preferably at least 50%, even more preferably at least 75%, very particularly preferably at least 90% and most preferably all of the at least two different data sets in which the same color recipe identification code is stored, also include information for at least one further parameter, wherein this information about the at least one further parameter is characteristic of the color recipe and is identical in all of the at least two different data sets. This can be done, for example, simply by the fact that these data sets for these parameters access a table relating to this color recipe, in which all information about the parameters directly associated with the color recipe is stored. This not only ensures that the database does not contain two or more data sets which contain information about almost identical or very similar color recipes, identical information about the substrate and the application method, and identical or almost identical information about the hues which result after the application of the color recipes using the application method to the substrate and are indistinguishable to the human eye. In addition, this reliably prevents the data sets relating to the same color recipe from containing different information in terms of the parameters directly associated with the color recipe (i.e. for those parameters that are characteristic of the color recipe), such as chemical resistance or temperature resistance of the color recipe.

Examples of suitable parameters directly associated with the color recipe in the sense of the embodiment described above are those which are selected from the group consisting of resistance of the color recipe to light, to temperature, to gamma rays, to chemicals, to pasteurization, to sterilization, to moisture and any combination of two or more of the aforementioned.

In order to maintain the high data quality of the database, it is provided according to a further particularly preferred embodiment of the present invention that when a new data set is created in the database, the user, and preferably the computer program operating the data entry into the database, automatically checks whether or not, for the color recipe about which information is to be stored in the data set to be newly created, there is already at least one data set contained within the aforementioned tolerance range, wherein, if not, the new data set is created and a newly assigned color recipe identification code is stored in it, and, if so, it is also checked whether the at least one data set contains information about the same substrate, about the same application method and about the same hue resulting after the application of the color recipe using the application method on the substrate, wherein, if so, the user receives a message that a corresponding data set is already contained in the database and then the data set to be created is not created or is created only if the user confirms that it should be created anyway, and, if not, the same color recipe identification code is stored in the data set to be newly created.

In the context of the present invention, information about the color recipe stored in the data sets is understood to mean all types of information which uniquely characterize the color recipe. For example, this information can include details of all the individual components or raw materials contained in the color recipe, as well as their quantities. However, it is also possible to specify the color recipe as a mixture of semi-finished products, such as a mixture of one or more blends and one or more colorants. It is also possible to specify the color recipe as a mixture of finished products, such as a mixture of two or more colors. In these cases, the information includes the specification of all individual components or raw materials contained in the color recipe and their quantities, the specification of all semi-finished products contained in the color recipe and their quantities or the specification of all finished products contained in the color recipe and their quantities. It is also possible to specify the color recipe as a mixture of individual components or raw materials and semi-finished products, as a mixture of individual components or raw materials and finished products, as a mixture of semi-finished products and finished products or as a mixture of individual components or raw materials, semi-finished products and finished products. Finally, it is also possible to specify the color recipe using a trade name or a code made up of combinations of letters and/or numbers.

According to a particularly preferred embodiment of the present invention, it is provided that at least one, preferably at least 10%, particularly preferably at least 50%, more preferably at least 80%, very particularly preferably at least 90% and most preferably all of the color recipes about which information is contained in the data sets of the database are composed of semi-finished products, namely preferably of at least one colorant and at least one non-coloring blend. These are particularly preferably composed of two to fifteen and particularly preferably two to ten semi-finished products. For example, it is preferred that these are composed of two to four colorants and a non-coloring blend. For example, further semi-finished products or raw materials such as solvents or solvent mixtures, additives such as slip additives, wax additives or defoamers, adhesion promoters, photoinitiators, stabilizers, drying agents, hardeners or the like can be added to these coloring and non-coloring components. In this embodiment, the information about the color recipe stored in the data sets includes the specification of all semi-finished products contained in the color recipe and their quantities. The non-coloring blend can contain at least one component selected from the group consisting of binders, solvents, waxes, additives, reactive thinners, photoinitiators, hardeners and any combination of two or more of these compounds. The at least one colorant is preferably a pigment formulation in solid, liquid or paste form or a formulation containing one or more dyes in which one pigment or a mixture of two or more pigments, or one dye or a mixture of several dyes is dispersed in solvent, binder or a mixture of solvent and binder. The colorant can contain, for example, at least one effect pigment which is preferably selected from the group consisting of metallic effect pigments, pearlescent pigments, mica coated with metal oxide, interference pigments, luminescent pigments, UV-absorbing pigments, IR-absorbing pigments, photochromic pigments, thermochromic pigments, piezo-electronic pigments, magnetic pigments, and any combination of two or more of the above pigment types. Alternatively, or in addition to this, non-effect pigments, such as colored pigments, white pigments, black pigments or dyes, can also be used. The at least one colorant preferably additionally contains one or more compounds selected from the group consisting of additives, reactive thinners, photoinitiators, hardeners and any combinations of two or more of the above compounds. For example, the at least one colorant can contain a dispersant as an additive.

According to an alternative embodiment of the present invention, it is provided that at least one, preferably at least 10%, particularly preferably at least 50%, more preferably at least 80%, very particularly preferably at least 90% and most preferably all of the color recipes about which information is contained in the data sets of the database are composed of finished products, namely preferably of two to fifteen colors and particularly preferably of two to ten colors. These can contain at least one effect pigment as a colorant, which is preferably selected from the group consisting of metallic effect pigments, pearlescent pigments, mica coated with metal oxide, interference pigments, luminescent pigments, UV-absorbing pigments, IR-absorbing pigments, photochromic pigments, thermochromic pigments, piezo-electronic pigments, magnetic pigments, and any combination of two or more of the above pigment types. Alternatively, or in addition to this, non-effect pigments or dyes can also be used.

According to a further, alternative embodiment of the present invention, it is provided that some of the color recipes about which information is contained in the data sets of the database are composed of finished products, namely preferably from two to five colors and possibly an additional color-neutral component such as a blend, whereas the other part of the color recipes is composed of semi-finished products, namely preferably two to ten semi-finished products.

The present invention is not limited with regard to the type of color recipes about which information is contained in the data sets of the database. Preferably at least one, preferably at least 10%, particularly preferably at least 50%, more preferably at least 80%, very particularly preferably at least 90% and most preferably all color recipes about which information is contained in the data sets of the database are selected from the group which consists of printing inks, color coatings, powder coatings, leather inks and textile inks.

In addition to the information about the hue and the information about the color recipe, the corresponding data sets also contain information about the application method and the substrate, from which the hue results through application of the color recipe about which information is contained in these data sets, using the application method on the substrate about which information is contained in these datasets. While the information on the application method includes the specification of the application method, such as web offset printing, the specification of a number and/or letter code or text or the like identifying the application method, the information on the substrate is, for example, the specification of the substrate, such as a special paper, the specification of a number and/or letter code or text identifying the substrate or is the data of a spectral curve recorded over a wavelength range from 180 to 4000 nm, preferably from 400 to 700 nm, such as in particular a spectral reflection curve, or is the lab values of the substrate or the like.

The present invention is not restricted with regard to the type of application method about which information is contained in the data sets of the database. The application method can therefore be any application method with which a color recipe can be applied to a substrate. For example, the application method about which information is contained in the data sets in the database can be an application method selected from the group that consists of printing methods, leather dyeing processes, textile dyeing processes, painting, rolling, spraying, dipping, roller coating, flooding, glazing, powder coating, enameling and any combination of two or more of the above methods. The application method about which information is contained in the data sets of the database is preferably one which is selected from flat printing, gravure printing, flexographic printing, digital printing, screen printing, letterpress printing, pad printing, transfer printing, sublimation printing, collotype printing, leather dyeing processes, textile dyeing processes, and any combination of two or more of the above methods. Examples of flat printing are sheet-fed offset printing, web offset printing, stone printing, lithographic printing, whereas examples of digital printing are xerography and inkjet.

The above statements regarding the information about application methods stored for this purpose in the data sets of the database apply equally to the target application method to be entered in step b) of the method according to the invention. The target application method to be specified by the user in step b) can therefore be the specification of the application method, the specification of a numerical and/or number code or text or the like that identifies the application method, wherein target application methods can be selected from the same group of methods as described above.

The present invention is also not particularly limited with regard to the type of substrate about which information is contained in the data sets in the database and the target substrate that is entered in step b). The substrate and the target substrate can therefore be any substrate to which a color recipe can be applied using an application method. For example, the substrate and the target substrate can be a substrate selected from the group consisting of paper, cardboard, paperboard, plastics film, leather, textile, metal, wood, glass, ceramics, skin, metallized surfaces, concrete, plastics bodies, laminates, composite materials and any combination of two or more of the above substrates. The substrate or the target substrate is preferably selected from the group consisting of newsprint, uncoated paper, coated paper, cardboard, paperboard, corrugated cardboard, plastics film (for example made of PE polyethylene, OPP polypropylene, OPA polyimide, PVC polyvinyl chloride, PET polyethylene terephthalate, PLA polylactide film), felts, nonwovens, laminates made of plastics and aluminum film, leather, textile and any combination of two or more of the above substrates.

The information on the substrate contained in the data sets can include the specification of the substrate, such as a special paper, the specification of a numerical and/or letter code or text identifying the substrate, the data of a spectral curve recorded over a wavelength range of 180 up to 4000 nm, preferably from 400 to 700 nm, such as in particular a spectral reflection curve, the lab values of the substrate or the like. As an alternative or in addition to this, for example, its designation or trade name can also be entered or the spectral curve can be measured or read in for the substrate. The information about the respective substrates stored in the data sets of the database is preferably data of a spectral curve that has been obtained by recording a spectral curve of the relevant substrate with a spectrophotometer over a wavelength range from 180 to 4000 nm, preferably from 400 to 700 nm. This is particularly preferably a spectral reflection curve recorded over a wavelength range from 180 to 4000 nm, preferably from 400 to 700 nm, for which curve the overall reflection, total reflection, diffuse reflection or directional reflection can be measured. The measurement can take place, for example, at an angle of incidence/sensor measuring angle of 45°/0°, at 0°/45°, with diffuse irradiation/0°, with diffuse irradiation/8° or at other angles, each in relation to the surface. In this embodiment of the present invention, the data of the spectral curve can be the reflection values for each nanometer between 180 and 4000 nm, preferably between 400 and 700 nm, the reflection values for every fifth nanometer between 180 and 4000 nm, preferably between 400 and 700 nm, the reflection values for every tenth nanometer between 180 and 4000 nm, preferably between 400 and 700 nm, or the reflection values at other distances.

The above statements on the substrate and the information stored for this purpose in the data sets of the database apply equally to the target substrate to be entered in step b) of the method according to the invention. The target substrate can therefore be selected in particular from the group described above. In addition, it is particularly possible to enter, in step b), for the target substrate, a numerical and/or letter code or text identifying the substrate, the data of a spectral curve recorded over a wavelength range from 180 to 4000 nm, preferably from 400 to 700 nm, such as in particular a spectral reflection curve, the lab values of the target substrate, the designation or the trade name of the target substrate.

The specification in step b) is preferably carried out by the user making entries in the computer program. In order to enable the user to enter the specification into the computer program in step b), it is proposed in a further development of the concept according to the invention that the computer program contains clickable pre-selections of the parameters to be entered, namely target application method, target substrate and target hue. As an alternative to this, the specification can also take place by transferring data, for example by transferring corresponding data from a file stored on a data carrier or in a computer to the computer program.

In order to enable the target application method to be specified in step b), it is preferred that the computer program contains clickable pre-selections of application methods from which the user can specify the target application method by clicking in step b). Alternatively, the computer program can be programmed in such a way that it enables the target application method to be entered as text or as numerical and/or text codes that identify the target application method.

In a further development of the concept according to the invention, it is proposed that the computer program be configured in such a way that the user can specify the target substrate in at least one and preferably all of the following ways in step b):
  i) transferring the data of a spectral curve recorded with a spectrophotometer between 180 and 4000 nm and preferably between 400 and 700 nm, preferably a spectral reflection curve and particularly preferably a spectral reflection curve of the target substrate measured as explained above, into the computer program, for example directly (i.e. without an interposed data carrier), from a DVD, a USB stick or the like,
  ii) clicking on the target substrate from a collection of pre-selections for different substrates stored in the computer program,
  iii) inputting the values of a spectral curve, preferably a spectral reflection curve and particularly preferably a spectral reflection curve of the target substrate measured as explained above, into the computer program, for example by entering the reflection values for the wavelengths between 180 and 4000 nm and preferably between 400 and 700 nm at 1 nm intervals, at 5 nm intervals, at 10 nm intervals or at other intervals as numbers,
  iv) entering or transferring the lab values of the target substrate or values of another color space, such as LUV values, RGB values, LCh values, XYZ values or the like, into the computer program.

It is likewise preferred that the computer program is configured in such a way that the user can specify the target hue in at least one and preferably all of the following ways in step b):
  i) transferring the data of a spectral curve recorded with a spectrophotometer between 180 and 4000 nm and preferably between 400 and 700 nm, preferably a spectral reflection curve and particularly preferably a spectral reflection curve of the target hue measured as explained above, into the computer program, for example directly (i.e. without an interposed data carrier), from a DVD, a USB stick or the like,
  ii) clicking on the target hue from a collection of pre-selections for different hues stored in the computer program,
  iii) entering or reading in the values of a spectral curve, preferably a spectral reflection curve and particularly preferably a spectral reflection curve of the target hue measured as explained above, into the computer program, for example by entering the reflection values for the wavelengths between 180 and 4000 nm and preferably between 400 and 700 nm at 1 nm intervals, at 5 nm intervals, at 10 nm intervals or at other intervals as numbers,
  iv) entering, reading in or transferring the lab values of the target hue or values of another color space, such as LUV values, RGB values, LCh values, XYZ values or the like, into the computer program.

According to the invention, in step c) the database is searched with a computer program to determine whether it contains at least one data set whose color recipe about which information is contained in the data set results, after application using the target application method specified in step b) to the target substrate specified in step b), in a color product with a hue which corresponds to the target hue specified in step b) or deviates from it at most with a specified tolerance. A tolerance is granted in order to take into account the fact that the human eye cannot perceive the slightest differences between two almost identical hues. Setting up a tolerance therefore increases the probability of a hit in step c) without having to accept unacceptable deviations from the specified target hue.

According to one embodiment of the present invention, a tolerance for step c) is preset in the computer program.

Alternatively, it can be provided that the user can enter the tolerance for step c) into the computer program. For this purpose, the computer program can be configured in such a way that it allows the tolerance to be set continuously, for example by entering a numerical value. It is also possible for the computer program to be designed in such a way that the user can set the tolerance in accordance with default settings specified in the computer program, for example by the user clicking on and selecting one of a plurality of tolerances specified by the computer program. It is also possible to combine both embodiments by configuring the computer program in such a way that the user can decide whether to set the tolerance in accordance with default settings specified in the computer program or, for example, by entering a numerical value.

In a further development of the concept according to the invention, it is proposed to set the maximum tolerance so that in step c) it corresponds to a Delta E value of a maximum of 2, preferably a maximum of 1, particularly preferably a maximum of 0.5, and very particularly preferably a maximum of 0.2, regardless of whether this tolerance is preset in the computer program or is entered by the user. All common Delta E values can be used as Delta E values, such as the $\Delta E^*_{ab}$, the $\Delta E94$, the $\Delta E_{00}$, the DIN99, the $DIN99_o$, the CMC, the Lübbe, the Lübbe corrected, the CIECAM02. Preferably, the $\Delta E_{00}$ is used.

According to a further preferred embodiment of the present invention, it is provided that in step d) only the color recipe which best results in the target hue is displayed. If in step c) two or more data sets are found whose color recipes about which information is contained in the data set result, after application using the target application method specified in step b) to the target substrate specified in step b), in a color product with a hue which corresponds to the target hue specified in step b) or deviates from it at most with a specified tolerance, therefore, according to this preferred embodiment, only that data set is displayed which results in a color product with a hue that least (i.e. with the lowest $\Delta E_{00}$ value) deviates from the target hue.

As explained above, the color recipe can in principle be given as a recipe for the quantities of all individual raw materials. However, since such color recipes are very complex, this means that the entire color has to be produced in a particularly logistically complex production process, since all raw materials must first be procured. Therefore, it is preferred that the color recipe is specified as a mixture of semi-finished products, such as a mixture of one or more blends and one or more colorants, or as a mixture of finished products, such as a mixture of several colors, optionally with additional blending. For this reason, it is preferred that in step d) the composition of the color recipe is indicated i) as a mixture of semi-finished products, preferably as a mixture of two to fifteen semi-finished products and particularly preferably as a mixture of two to five semi-finished products, or is indicated ii) as a mixture of finished products, preferably as a mixture of two to fifteen finished products and particularly preferably as a mixture of two to five finished products, or is indicated iii) as a mixture of semi-finished products with finished products, or is indicated iv) as a mixture of semi-finished products with individual components, or is indicated v) as a mixture of finished products with individual components, or is indicated vi) as a mixture of semi-finished products, finished products and individual components, or is indicated vii) as a mixture of individual components.

The display of the information about the color recipe stored in the at least one data set therefore includes in these embodiments the specification of the quantities and the designation of the individual semi-finished products or finished products from which the color recipe is composed.

The present invention is particularly suitable for the use of databases with a large number of data sets. The database used in the method according to the invention preferably comprises more than 10 data sets, more preferably more than 100 data sets, even more preferably more than 1,000 data sets, particularly preferably more than 10,000 data sets, particularly preferably more than 100,000 data sets, very particularly preferably more than 500,000 data sets and most preferably a million data sets or more.

After displaying the hit found in step c) of the method according to the invention, the user can produce the color recipe found or have it produced by a service provider. In particular, in the event that the color recipe found in step c), according to the information contained in the database, after application using the target application method specified in step b) to the target substrate specified in step b) results in a color product with a hue that deviates from the target hue specified in step b) within a specified tolerance with, for example, a $\Delta E_{00}$ value of 0.5, it is advantageous if the user can visually look at the resulting hue before deciding whether or not to accept it and produce or have the color produced, without first having to make the color recipe. In order to enable this with as little effort as possible, it is provided according to a further particularly preferred embodiment of the present invention that the computer program comprises a test algorithm which can simulate or calculate a hue, wherein the simulated or calculated hue, printed out using a computer via a test printer different from the target application method specified in step b) on a test substrate, produces the same hue as the application of the color recipe found in step c) using the target application method specified in step b) onto the target substrate specified in step b). In this embodiment, the computer program is preferably configured so that the user can specify a test paper printer and a test paper substrate, for example by clicking on a corresponding test printer and test substrate in a list displayed by the computer program, or by entering a numerical and/or number code or the like that identifies the test printer and the test substrate. The test printer is preferably a customary and globally commercially available paper printer, a sheet-fed offset printing machine, a screen printing machine or a gravure printing machine. The test printer is particularly preferably a customary and globally commercially available paper printer, particularly preferably an at least 4-color paper printer and most preferably an at least 7-color paper printer. In this context, an at least 4-color paper printer means an at least 4-color paper printer, a 5-color paper printer, a 6-color paper printer or a paper printer comprising even more colors, and an at least 7-color paper printer in this context means a 7-color paper printer, an 8-color paper printer, a 9-color paper printer, or a paper printer comprising even more colors. In this way, specified hues can be reproduced very precisely. Common 4-color printers are typically based on the colors cyan, magenta, yellow and black. According to the present invention, a suitable at least 7-color printer preferably comprises the colors cyan, magenta, yellow, black, orange, violet and green. In particular, the test paper printer is a customary and globally commercially available inkjet printer or laser printer, and most preferably an at least 7-color inkjet printer. The test substrate is preferably a customary and globally commercially available inkjet printing or laser printing paper. This embodiment allows the user to simply and inexpensively look at and evaluate the hue that results when the color recipe displayed in step d) of the method according to the invention is applied to the target substrate using the target application method, without the color recipe displayed in step d) of the method according to the invention having to be applied to the target substrate, which may be expensive to procure under certain circumstances, using the target application method, which may be complex under certain circumstances. This is because the hue calculated with the test algorithm corresponds to the hue that results when the color recipe displayed in step d) is applied to the target substrate using the target application method. This embodiment of the present invention therefore allows the user to check particularly easily and quickly whether the color recipe displayed in step d) is the correct one for his needs. If it is the right one, he can order it from a suitable manufacturer.

Often the color product aimed for by the user is not just a substrate provided with a color, but, for example, a corresponding color product in which, after the color recipe has been applied to the specified substrate using the specified application method, a topcoat or primer has been applied. If the topcoat or primer is not color-neutral, such as in the case of matte paints, effect paints, haptic paints, scented paints, it changes the hue of the color product at least slightly. Even if the topcoat or primer is neutral in color, the topcoat or primer affects the gloss of the color product. In order to take these effects into account in the method, it is preferred that at least some of the data sets, such as at least 10% and preferably at least 30% of the data sets also contain specifications about a topcoat or primer, wherein the hue stored in the relevant data set is the one of the color product which is obtained by printing the color recipe stored in the data set using the application method stored in the data set onto the substrate stored in the data set and then applying the topcoat or primer stored in the data set. This ensures that, even if a topcoat or primer is used, the method according to the invention ascertains a color recipe which, with the specified tolerance, results in the desired hue for the color product containing the topcoat or primer.

For the above reasons, it is preferred that the computer program used in the method according to the invention is configured so that the user can specify a topcoat or primer and an amount for the topcoat or primer to be applied in step b) and the database is searched in step c) to see whether it contains at least one data set whose stored color recipe results in the specified hue with a specified maximum tolerance when the color recipe stored in the data set is applied to the target substrate specified in step b) using the target application method specified in step b) and then the overcoat or primer specified in step b) is applied in the specified amount.

This embodiment is also particularly preferred for printing inks, in which case the overcoat is an overcoat varnish, the application method is a printing method, and the substrate is paper, cardboard, sheet metal or a plastics film.

In addition to printing inks, the method according to the invention is also particularly suitable for leather and textile dyeing processes, so that the application method can in particular be a leather dyeing process or a textile dyeing process and the substrate can be a leather or a textile.

According to a further particularly preferred embodiment of the present invention, it is provided that at least 10%, preferably at least 25%, more preferably at least 50%, even more preferably at least 75%, very particularly preferably at least 90% and most preferably all of the data sets also contain information about at least one of the following characteristics:

i) one or more halftones of the color product,
ii) gloss level of the color product,
iii) different gloss levels at different viewing angles of the color product,
iv) haptic (i.e. tactilely perceptible) properties of the color product,
v) scratch-resistance of the color product,
vi) tear strength of the color product,
vii) tensile strength of the color product,
viii) resistance of the color product to light,
ix) resistance of the color product to temperature,
x) resistance of the color product to gamma rays,
xi) resistance of the color product to chemicals,
xii) resistance of the color product to pasteurization,
xiii) resistance of the color product to sterilization,
xiv) resistance of the color product to moisture,
xv) resistance of the color product to delamination,
xvi) absence of certain ingredients in the color recipe,
xvii) opacity of the color product,
xviii) slipping properties of the color product.

The color product is, in turn, the product that is obtained by applying the color recipe about which information is contained in the corresponding data set to the substrate about which information is contained in the corresponding data set using the application method about which information is contained in the corresponding data set.

According to a further embodiment of the present invention, the application method is a textile dyeing process for which it is provided that at least 10%, preferably at least 25%, more preferably at least 50%, even more preferably at least 75%, very particularly preferably at least 90% and most preferably all of the data sets also contain information about at least one of the following characteristics:

i) anti-static finish,
ii) flame-retardant finish,
iii) water repellency,
iv) oil repellency,
v) hydrophilization,
vi) fixation,
vii) finishing,
viii) conditioning,
ix) coating with wax,
x) coating with fluorocarbon resins,
xi) fastness to light,
xii) wash-resistance,
xiii) fastness to rubbing.

According to a further embodiment of the present invention, the application method is a leather dyeing process for which it is provided that at least 10%, preferably at least 25%, more preferably at least 50%, even more preferably at least 75%, very particularly preferably at least 90% and most preferably all of the data sets also contain information about at least one of the following characteristics:

i) polyurethane dressing,
ii) aniline dressing,
iii) nitrocellulose dressing,
iv) impregnation,
v) embossing,
vi) oil dressing,
vii) wax dressing,
viii) coating (oil coating),
ix) coating (cold coating), x) fastness to light,
xi) fastness to rubbing,
xii) dirt repellency,
xiii) gloss.

These last three embodiments make it possible, with the method according to the invention, not only to ascertain a color recipe which, when applied to the desired target substrate using the desired target application method, results in a color product with the desired target hue, but in particular also to ascertain a corresponding color recipe which has the desired additional properties such as a desired chemical resistance, and leads to a desired gloss of the color product or the like.

To implement this embodiment, it is also preferred that the computer program used in the method according to the invention is configured so that the user can additionally specify in step b) at least one of the characteristics i) to xviii) for printing methods, or i) to xiii) for textiles and leather.

In order to achieve the advantages for this embodiment to a greater extent, it is proposed in a further development of the concept according to the invention that at least 10%, preferably at least 25%, more preferably at least 50%, even more preferably at least 75%, very particularly preferably at least 90% and most preferably all of the data sets also contain information about at least three, preferably at least five, particularly preferably at least 10, very particularly preferably at least 15 and most preferably all of the characteristics i) to xviii), and preferably the user can specify this in step b).

In a further development of the concept according to the invention, it is proposed that at least 10%, preferably at least 50%, particularly preferably at least 80%, more preferably at least 90%, very particularly preferably at least 95% and most preferably all of the data sets contained in the database at three different angles, preferably at 20°, at 60° and at 85°, but at least at 60° in relation to the surface of the color product, contain certain gloss values, and that the user can specify in step b) values for the target gloss values to be achieved at the three different angles for the color product. In this embodiment it is particularly preferred that the gloss values are graded at least between glossy, semi-matte and matte. For example, matte paints can have gloss values between 0 and 24, semi-matte paints can correspond to gloss values between 25 and 50, and gloss paints can correspond to gloss values above 51.

The gloss values are measured in accordance with DIN 67530/ISO 2813 and the paints are applied, for example, with a 6-μm doctor blade.

According to a further very particularly preferred embodiment of the present invention, it is provided that at least 10%, preferably at least 50%, particularly preferably at least 80%, more preferably at least 90%, very particularly preferably at least 95% and most preferably all of the data sets contained in the database include information about at least one halftone, this information containing at least information about the hue that the color product has, which is obtained when the color recipe about which information is stored in the corresponding data set is applied to the target substrate as a halftone using the target application method. This enables a statement to be made about how the desired hue appears in the full tone and in the individual gradations/halftones or which spectral curves result accordingly. This is preferred in order to be able to distinguish visually as well as spectrally identical hues, which have been mixed from several different pigment combinations, in the halftones. The full tones can appear the same visually and spectrally, but different hues/color locations are obtained in the halftones if different pigment combinations are present.

In this embodiment, it is particularly preferred that the corresponding data sets include corresponding information about at least two halftones, preferably about at least 4 halftones and particularly preferably at least 6 halftones, wherein the information about each of the at least two halftones contains at least information about the relevant hue that the relevant color product has, which is obtained when the color recipe about which information is stored in the corresponding data set is applied to the target substrate as the relevant halftone using the target application method. The halftones about which information is contained in the relevant data set preferably cover at least 25%, particularly preferably at least 50%, very particularly preferably at least 75% and most preferably the entire halftone range.

To implement this embodiment, it is also preferred that the computer program used in the method according to the invention is configured in such a way that the user can specify (measure, read in) values both for the full tone and for at least one halftone in step b).

In particular at the beginning of the construction of the database used for the method according to the invention, at which it does not yet contain data sets for all possible combinations of application method, substrate and hue, along with any other optional characteristics i) to xviii), it will be inevitable that for a special combination of target application method, target substrate and target hue entered in step b), no suitable data set is found in method step c). In order to also provide the user with a color recipe in this case with which he can carry out his desired project, it is proposed in a further development of the concept according to the invention that the computer program includes a recipe algorithm which allows a color recipe to be calculated which, after the application using the specified target application method on the specified target substrate results in the specified hue for the target color product with a specified maximum tolerance.

The computer program is preferably configured in such a way that the recipe algorithm which calculates the color recipe is carried out if no suitable data set was found in step c).

Furthermore, it is preferred that, before the recipe algorithm calculating the color recipe is carried out, appropriate components for the color recipe are transferred from the computer program to the recipe algorithm based on the specifications of the user, from which the recipe algorithm alone calculates the color recipe. Components for the color recipe are understood to mean raw materials, semi-finished products and/or finished products that are stored in the database together with their properties and color properties. This embodiment makes it possible to calculate a color recipe with which the user not only receives the desired target hue, but which in particular also fulfills the further specified characteristics, such as one or more of the characteristics i) to xviii). If, for example, the user specifies a certain chemical resistance to be achieved, for example to acids, in step b), the computer program only transfers those components, i.e. raw materials, semi-finished products and/or finished products, to the recipe algorithm that have this chemical resistance.

In the above embodiment of the present invention, it is also preferred that the components for the color recipe transferred from the computer program to the recipe algorithm in particular meet at least one, preferably at least three, more preferably at least five, particularly preferably at least ten, very particularly preferably at least fifteen and most preferably all of the criteria i) to xvi) specified by the user.

According to a further very particularly preferred embodiment of the present invention, it is provided that at least 10%, preferably at least 20%, particularly preferably at least 40%, more preferably at least 60%, very particularly preferably at least 80% and most preferably all of the data sets also include information about the spectral curve of the surface of a first production color product which has been obtained by, for example, spread coating a part of a first production batch of the color recipe indicated in step d) onto a white coated paper and recording a spectral curve, particularly preferably a spectral reflection curve between 180 and 4000 nm, preferably between 400 and 700 nm of the surface thereof with a spectrophotometer. In addition to spread coating, the first production batch can also be applied to the substrate, preferably paper, using any other application method, such as laboratory proofing, spray painting or doctor blade strokes. This embodiment facilitates quality control for each further production batch produced. For each further production batch, a part of the further production batch of the color recipe can then be spread coated onto the same coated paper for quality control and a spectral curve can be recorded from the surface of the color product obtained in this way under the same conditions as for the first production batch. The spectral curve obtained in this way then only has to be compared with the spectral curve stored in the data set. If the deviation obtained from this comparison is within a specified tolerance range, the batch can be released. Otherwise, this must be corrected by adding one or more components until a hue within the tolerance range is obtained for a reference color product manufactured therewith.

In a further development of the concept according to the invention, it is proposed that in this embodiment at least 10%, more preferably at least 20%, particularly preferably at least 40%, even more preferably at least 60%, very particularly preferably at least 80% and most preferably all of the data sets also comprise the spectral curve of the surface of a second production color product, which has been obtained by, for example, spread coating a part of a second production batch of the color recipe indicated in step d) onto a white coated paper and recording a spectral curve between 180 and 4000 nm, preferably between 400 and 700 nm of the surface thereof with a spectrophotometer. In addition to spread coating, the second production batch can also be applied to the substrate, preferably paper, using any other application method, such as, for example, laboratory proofing or doctor blade strokes.

In addition, it is preferred in this embodiment of the present invention that the data sets include, in addition to the spectral curve of the second production color product, the spectral curve of a color product produced with a reserve sample of the first production batch, which has been obtained by spread coating a part of a reserve sample of the first production batch of the color recipe indicated in step d) onto a white coated paper, and recording a spectral curve between 180 and 4000 nm, preferably between 400 and 700 nm of the surface thereof with a spectrophotometer at the same time as the spread coating and recording of the spectral curve of the part of the second production batch of the color recipe indicated in step d). By spread coating both samples onto the same white coated paper at the same time and comparing them, the accuracy of the quality control can be further increased.

In a further development of the concept according to the invention, it is proposed that at least one, preferably at least 10%, more preferably at least 50%, particularly preferably at least 80%, more preferably at least 90%, very particularly preferably at least 95% and most preferably all of the data sets comprise information about at least one reference hue, one reference application method and one reference substrate, wherein the reference hue is obtained when the color recipe about which information is contained in the data set is applied to the reference substrate using the reference application method, wherein the reference application method is different from the application method about which information is contained in the data set and/or the reference substrate is different from the substrate about which information is contained in the data set.

Since at least one of the data sets, preferably a large number of the data sets and particularly preferably all data sets also contain information about at least one reference hue, one reference application method and one reference substrate, a produced batch of the color recipe can easily be subjected to reliable quality control. It is only necessary to apply a corresponding amount of the manufactured batch of the color recipe to the reference substrate using the reference application method and then to compare the hue of the reference color product manufactured in this way with the reference hue about which information is contained in the data set. If the deviation obtained from this comparison is within a specified tolerance range, the batch can be released. Otherwise, this must be corrected by adding one or more components until a hue within the tolerance range is obtained for a reference color product manufactured therewith. A particular advantage of the method according to the invention is that the quality control does not require the color manufacturer to apply the produced color recipe using the target application method specified by the customer (which usually requires a complex system) to the target substrate specified by the customer (possibly very special and commercially poorly available), but he only has to use a reference substrate, which is, for example, a standard paper available all over the world and common, with a reference application method (preferably simple and not requiring a complex system). Otherwise, the color manufacturer would have to procure the corresponding target substrate specified by the customer for each individual color recipe, which may not be available or be very difficult to find at his location, and use the specific target application method specified by the customer. In this case, the color manufacturer, who produces a multitude of different color recipes, would need an enormously large warehouse with a multitude of different, possibly difficult to obtain target substrates as well as a multitude of different application systems, such as a web offset printing machine, a gravure printing machine and the like. According to the invention, on the other hand, a reference substrate and a reference application method may be sufficient if the same reference substrate and reference application method are stored for all color recipes available in the database. Several reference application methods may be required, for example due to the consistency of the colors (pasty, liquid, powdery). In the context of the present invention, standard paper is understood to mean a paper which is standardized in a national or international standard. Examples of suitable standard papers are specified in the DIN ISO 2846-1: 2017 standard. If, for example, liquid colors are applied to a transparent film, a standard paper can be placed underneath before the spectral curve is recorded in order to also ensure standardized conditions for recording the spectral curve.

The present invention is not particularly limited with regard to the number of reference hues contained per data set. Therefore, some of the data sets can each contain information about a reference hue and the associated reference application method and the associated reference substrate and other data sets can each contain information about two or more different reference hues as well as the associated reference application methods and reference substrates, which each result in the same target hue using a different application method and/or on a different substrate.

In a further development of the concept according to the invention, it is proposed that the at least one reference hue of the at least one data set is also indicated in step d). The user can then use this for later quality control or save it, provided that he produces the color recipe, or pass it on to the service provider who has the color recipe made. The at least one reference hue can be specified in any form which uniquely characterizes the reference hue. For example, the at least one reference hue can be indicated as lab values (or values of another color space, such as LUV values, RGB values, LCh values, XYZ values or the like), as a spectral curve (in particular a spectral reflection curve) between 180 and 4000 nm and preferably between 400 and 700 nm or as data of a spectral curve (in particular a spectral reflection curve) between 180 and 4000 nm and preferably between 400 and 700 nm.

Another object of the present invention is a database for ascertaining a color recipe which, after application using a specified application method on a specified substrate, results in a color product with a specified hue, wherein a plurality of data sets is stored in the database, wherein at least one and preferably each of the data sets comprises at least information about a color recipe, about a substrate, about an application method and about the hue of the color product resulting after the application of the color recipe using the application method on the substrate, characterized in that
  i) the database, for at least one hue, comprises at least two different data sets, each of which includes the same hue identification code and information about different color recipes, about a substrate and about an application method, wherein the substrate and/or application method of at least one of the at least two different data sets differs from the substrate and/or application method of another of the at least two different data sets, wherein for each of the different color recipes of the at least two different data sets, after the application of the relevant color recipe using the application method stored in the relevant data set on the substrate stored in the relevant data set, a color product with the same hue is obtained, and
  ii) the database, for at least one color recipe, comprises at least two different data sets, which each have the same color recipe identification code and information about the same color recipe, about a substrate, about an application method and about a hue resulting for the color product after the application of the color recipe stored in the relevant data set using the application method stored in the relevant data set on the substrate stored in the relevant data set, wherein the substrate and/or the application method of at least one of the at least two different data sets differs from the substrate and/or application method of another of the at least two different data sets, and wherein after the application of the relevant color recipe using the application method stored in the relevant data set, a color product results, wherein the hue of the color product of at least one of the at least two different data sets differs from the hue of the color product of another of the at least two different data sets, wherein:
  iii) in at least 90% of the data sets in which information is stored about a hue which is different from the hue of one or more other data sets, a different hue identification code is stored than in the one or more other data sets,
  and/or
  iv) in at least 90% of the data sets in which information is stored about a color recipe which differs from the color recipe of one or more other data sets, a different color recipe identification code is stored than in the one or more other data sets.

The database preferably comprises more than 10 data sets, more preferably more than 100 data sets, even more preferably more than 1,000 data sets, particularly preferably more than 10,000 data sets, particularly preferably more than 100,000 data sets, very particularly preferably more than 500,000 data sets and most preferably one million data sets or more.

Another object of the present invention is a system for ascertaining a color recipe which, after the application using a specified application method on a specified substrate, results in a color product with a specified hue, in particular for performing a method according to at least one of the previous embodiments, the system comprising:
  a) a previously described database,
  b) a computer program which is programmed in such a way that it allows a user to enter a target application method, a target substrate and a desired target hue for the obtained color product resulting after the application of a color recipe using the specified target application method on the specified target substrate into the computer program,
  c) wherein the computer program is also programmed so that it can search the database in order to ascertain whether the database contains at least one data set whose color recipe about which information is contained in the data set, after the application using the target application method specified in step b) on the target substrate specified in step b), results in a color product with a hue which corresponds to the target hue specified in step b) or deviates from it at most by a specified tolerance, and
  d) wherein the computer program is also programmed in such a way that, if at least one suitable data set is found in step c), it displays to the user the information about the color recipe stored in the at least one data set.

What is claimed is:

1. A method for ascertaining a color recipe which, after application using a specified application method on a specified substrate, results in a color product with a specified hue, the method comprising:
  a) Providing a database in which a multiplicity of data sets are stored, wherein
    i) at least a part of the data sets comprises at least information about a color recipe, about a substrate, about an application method and about the hue of the color product resulting from the application of the color recipe stored in the data set using the application method stored in the data set on the substrate, wherein the information about the color recipe includes a color recipe identification code and the information about the hue includes a hue identification code,
    ii) the database for at least one hue each comprises at least two different data sets, each of which includes the same hue identification code and information about different color recipes, about a substrate and about an application process, wherein the substrate and/or the application method of at least one of the at least two different data sets is different from the substrate and/or application method of another of the at least two different data sets, wherein for each of the different color recipes of the at least two different data sets in each case a color product with the same hue is obtained after the application of the respective color recipe using the application method stored in the respective data set to the substrate stored in the respective data set, and iii) the database for at least one color recipe comprises at least two different data sets each, which each have the same color recipe identification code and information about the same color recipe, about a substrate, about an application process and about a hue resulting for the color product after the application of the color recipe stored in the respective data set using the application method stored in the respective data set on the substrate, wherein the substrate and/or the application method of at least one of the at least two different data sets differs from the substrate and/or application method of another of the at least two different data sets, and wherein after the application of the respective color recipe with the application method stored in the respective data set on the substrate, a color product results, wherein the hue of the color product of at least one of the at least two different data sets differs from the hue of the color product of another of the at least two different data sets, b) Provision of a computer program which uses the database a) and specification of a target application method in the computer program, of a target substrate and of a desired target hue for the color product obtained by a user resulting after the application of a color recipe using the specified target application method on the specified target substrate, c) Searching the database with this computer program to see whether it contains at least one data set whose color recipe, about which information is contained in the data set, results after application using the target application method specified in step b) onto the target substrate specified in step b) in a color product with a hue which corresponds to the target hue specified in step b) or deviates from it at most with a specified tolerance, and d) if at least one suitable data set is found in step c), displaying the information about the color recipe stored in the at least one data set, characterized in that:

i) in at least 90% of the data sets in which information about a hue is stored which differs from the hue of one or several other data sets, a different hue shade identification code is stored than in the one or several other data sets, ii) in at least 90% of the data sets in which information about a color recipe is stored which differs from the color recipe of one or several other data sets, a different color recipe identification code is stored than in the one or several other data sets, iii) in at least 90% of the data sets in which information about a hue is stored which is the same than the hue of one or several other data sets, the same hue shade identification code is stored than in the one or several other data sets, and iv) in at least 90% of the data sets in which information about a color recipe is stored which is the same than the color recipe of one or several other data sets, the same color recipe identification code is stored than in the one or several other data sets, wherein in the database two hues are assessed as the same in the database if they differ from one another by a Delta E value of at most 0.5, two hues are assessed as different if they differ from one another by a Delta E value of more than 0.5, two color formulas are assessed as the same in the database if they have the same coloring components and differ from one another with regard to the quantities of the individual coloring components by a maximum of 0.5% per coloring component, and two color recipes are assessed as different if they have at least one different coloring component or, if they have the same coloring components, are different from one another by more than 0.5% per component with regard to the quantities of the individual coloring components, and wherein the computer program, when a user creates a new data set in the database, automatically checks whether the color recipe about which information is to be saved in the new data set to be created already includes at least one data set or not, whereby, if not, the new data set is created as well as in this new dataset a newly assigned color recipe identification code is stored, and, if yes, it is also checked whether the at least one data set contains information about the same substrate, about the same application method and about the same hue resulting after the application of the color recipe with the application method on the substrate, wherein, if yes, the user receives a message that a corresponding data set is already contained in the database and then the data set to be created is not created, and, if not, the same color recipe identification code is saved in the data set to be newly created.

2. The method according to claim 1, characterized in that two hues are assessed as the same in the database if they differ from one another by a $\Delta E_{00}$ value of a maximum of 0.5 and a dH* of a maximum of 0.5, and two hues are assessed as different if they differ from one another by a $\Delta E_{00}$ value of more than 0.5.

3. The method according to claim 1, characterized in that the database for at least 10% hues each includes at least two different data sets, each of which includes the same hue identification code and information about color recipes differing from one another, about a substrate and about an application method, wherein the substrate and/or application method of each of the at least two different data sets differs from the substrate and/or application method differs from each of the other at least two different data sets, wherein for each of the mutually different color recipes of the at least two different data sets, a color product with the same hue is obtained after the application of the respective color recipe using the application method stored in the respective data set to the substrate stored in the respective data set.

4. The method according to claim 3, characterized in that the database for the at least one hue each comprises at least four different data sets, each of which has the same hue identification code and information about mutually different color recipes, about a substrate and about an application method, wherein the substrate and/or application process of each of the at least four different data sets differs from the substrate and/or application process of each of the other of the at least four different data sets, wherein for each of the mutually different color recipes of the at least four different data sets in each case a color product with the same hue is obtained after the application of the respective color recipe using the application method stored in the respective data set on the substrate stored in the respective data set.

5. The method according to claim 1, characterized in that each data set for which, after the application of the color recipe stored in the respective data set using the application method stored in the respective data set on the substrate stored in the respective data set, a color product is obtained with a hue different from the one obtained for at least one other data set, a different hue identification code is stored than in all others of the at least one other data set.

6. The method according to claim 1, characterized in that the database for at least 10% color recipes each comprises at least two different data sets, each of which has the same color recipe identification code and information about the same color recipe, about a substrate, about an application method and a hue for a color product resulting after the application of the color recipe stored in the respective data set using the application process stored in the respective data set on the substrate stored in the respective data set, wherein the substrate and/or the application method of each of the at least two different data sets differs from the substrate and/or application method of each of the other at least two different data sets, and wherein after the application of the respective color recipe using the application method stored in the respective data set to the substrate stored in the respective data set, a color product results, wherein the hue of the color product from each of the at least two different data sets differs from the hue of the color products of all of the other at least two different data sets.

7. The method according to claim 6, characterized in that the database for the at least one color recipe comprises at least four different data sets, each of which has the same color recipe identification code and information about the same color recipe, about a substrate, about an application method and about a hue resulting for the color product after the application of the color recipe stored in the respective data set on the substrate stored in the respective data set, wherein the substrate and/or the application method of each of the at least four different data sets differs from the substrate of each of the other at least four different data sets, and wherein a color product results after the application of the respective color recipe using the application process stored in the respective data set on the substrate stored in the respective data set, wherein the hue of the color product of each of the at least four different data sets differs from the hue of the color products of all the other of the at least four different data sets.

8. The method according to claim 1, characterized in that a different color recipe identification code is stored in all of the data sets in which information about a color recipe is stored which is different from the color recipe of one or several other data sets than in the one or several other data sets.

9. The method according to claim 1, characterized in that at least 10% of the at least two different data sets in each of which the same color recipe identification code is stored, also contain information for at least one further parameter, wherein this information about the at least one further parameter is characteristic for the color recipe and is identical in all of the at least two different data sets.

10. The method according to claim 1, characterized in that the computer program comprises a test algorithm which can calculate a hue, wherein the calculated hue being printed out on a test paper substrate using a computer using a test paper printer different from the target application method specified in step b) results in the same hue as the application of the color recipe found in step c) with the target application method specified in step b) on the target substrate specified in step b).

11. The method according to claim 1, characterized in that the computer program comprises a recipe algorithm which allows a color recipe to be calculated which, after the application with the specified target application method on the specified target substrate, results in the specified hue for the target color product with a specified maximum tolerance, wherein the computer program is configured so that the recipe algorithm calculating the color recipe is carried out if no suitable data set was found in step c), and, before the execution of the recipe algorithm that calculates the color recipe based on the specifications of the user, appropriate components for the color recipe are transferred from the computer program to the recipe algorithm based on the specifications of the user, from which components the recipe algorithm alone calculates the color recipe.

* * * * *